(12) United States Patent
Hyun

(10) Patent No.: US 7,402,928 B2
(45) Date of Patent: Jul. 22, 2008

(54) SPINDLE MOTOR

(75) Inventor: Song Chung Hyun, Gwangju (KR)

(73) Assignee: LG Innotek Co., Ltd, Seoul (KR)

( * ) Notice: Subject to any disclaimer, the term of this patent is extended or adjusted under 35 U.S.C. 154(b) by 0 days.

(21) Appl. No.: 11/482,825

(22) Filed: Jul. 10, 2006

(65) Prior Publication Data
US 2007/0007836 A1   Jan. 11, 2007

(30) Foreign Application Priority Data
Jul. 11, 2005   (KR) .................. 10-2005-0062188

(51) Int. Cl.
*H02K 5/16* (2006.01)
(52) U.S. Cl. ........................................... 310/90
(58) Field of Classification Search ............... 310/90, 310/90.5
See application file for complete search history.

(56) References Cited

U.S. PATENT DOCUMENTS 3,726,575 A * 4/1973 Moorman .................. 384/420
6,661,131 B2 * 12/2003 Fukutani ..................... 310/51
6,713,907 B2 * 3/2004 Matsumoto ............... 310/67 R

FOREIGN PATENT DOCUMENTS

KR   2000-0044114 A   7/2000

* cited by examiner

*Primary Examiner*—Nguyen N Hanh
(74) *Attorney, Agent, or Firm*—Birch, Stewart, Kolasch & Birch, LLP

(57) ABSTRACT

Provided is a spindle motor including a rotor, a stator, and a base. The rotor includes a rotor yoke, a magnet, and a rotating shaft. The stator is disposed correspondingly to the rotor and includes a core and coils. The base includes a base plate for supporting the stator. The base plate is integrally formed with a housing. The housing has the core disposed at an exterior thereof and has a bearing for rotatably supporting the rotating shaft provided within. A thrust stopper for sealing the housing is fixed to a bottom of the housing.

10 Claims, 4 Drawing Sheets

SPINDLE MOTOR

BACKGROUND OF THE INVENTION

1. Field of the Invention

The present invention relates to a spindle motor.

2. Description of the Related Art

Prevalent examples of recording media that write and read images, sounds, and other types of data at high density include optical discs, hard discs, cards, and tapes; and of these, optical discs are at the forefront of the mainstream.

The field of optical discs includes products ranging from laser discs (LD) and compact discs (CD) to digital versatile discs (DVD).

Optical discs can be generally categorized into CDs and DVDs; CDs can be divided into CD-read only memory (CD-ROM) and CD-Rewritable (CD-RW); and DVDs can be split into DVD-ROMs and DVD-random access memory (RAM).

Such optical discs have tracks formed to spiral outward from the middle, whereon digital data of a predetermined format is written.

An optical disc apparatus for reading optical discs has a built-in spindle motor that spins an optical disc at high speed. The optical disc apparatus also includes a built-in actuator, which has a laser diode, a lens, a beam splitter, a photodetector, and other installed optical devices.

A spindle motor according to the related art includes a rotor and a stator. The stator has a bearing housing installed for holding a bearing in place.

However, the bearing housing of a spindle motor according to the related art is a separate component, so that it must be installed following its manufacture. Therefore, the number of manufacturing processes increases due to the installing of the bearing housing.

Also, a bearing housing according to the related art has a plurality of coupling portions formed thereon to couple it to the spindle motor, which complicates the configuration of the bearing housing and increases its size. Consequently, it is difficult for the device to satisfy the prevailing trend of miniaturizing spindle motors, while at the same time securing adequate interior space for ensuring that the motor's capabilities are not compromised.

Also, to prevent the rotating shaft and the rotor yoke from rising, a spindle motor according to the related art employs a washer assembled at its rotating shaft and bearing. Because this configuration does not allow facile assembly of the washer, not only does the assembly process of the unit become more complex, but also the structure does not allow for adequate interior space inside the spindle motor to secured.

Additionally, in spindle motor designs according to the related art, the gaps present between the bearing housing, the rotating shaft, and the upper portion of the bearing induce oil leakage.

SUMMARY OF THE INVENTION

Accordingly, the present invention is directed to a spindle motor that substantially obviates one or more problems due to limitations and disadvantages of the related art.

An object of the present invention is to provide a spindle motor with a structure that allows miniaturization of the motor without diminishing the space inside the motor, in order not to make lower the performances of the motor.

Another object of the present invention is to provide a spindle motor having an improved structure that allows a simpler manufacturing process.

An additional object of the present invention is to provide a spindle motor with a structure that can prevent the rotating shaft and the rotor yoke from rising.

A further object of the present invention is to provide a spindle motor with a structure that prevents oil leakage from the bearing housing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a spindle motor including: a rotor including a rotor yoke, a magnet, and a rotating shaft; a stator corresponding to the rotor and including a core and coils; and a base including a base plate for supporting the stator, wherein the base plate is integrally formed with a housing having the core disposed at an exterior thereof and a bearing provided within for rotatably supporting the rotating shaft, and a thrust stopper for sealing the housing is fixed to a bottom of the housing.

The spindle motor according to the present invention forms the housing for securing the bearing integrally on the base plate, to simplify the assembly process and consequently reduce the manufacturing cost and time of the motor.

Also, the spindle motor according to the present invention has a housing with an upper portion that is bent inward towards the rotating shaft, forming a ledge to prevent oil from leaking outside of the bearing housing.

Furthermore, the spindle motor according to the present invention provides a washer between the ledge and the bearing and forms a recess on the rotating shaft for the washer to catch on, in order to prevent the rotating shaft and the rotor yoke from rising.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
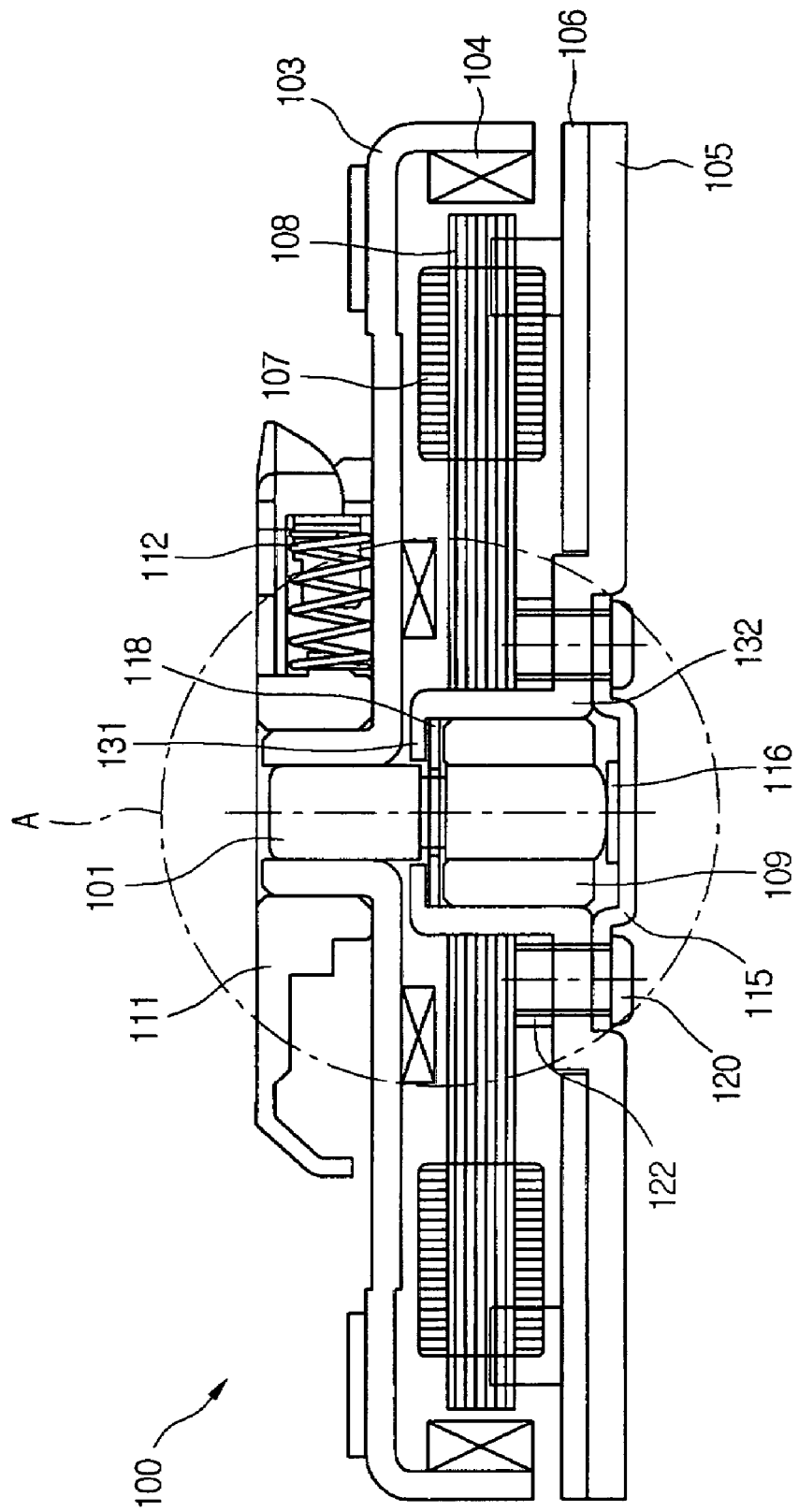
FIG. 1 is a sectional view showing a structure of a spindle motor which constitutes the first embodiment of the present invention.
Figure 2:
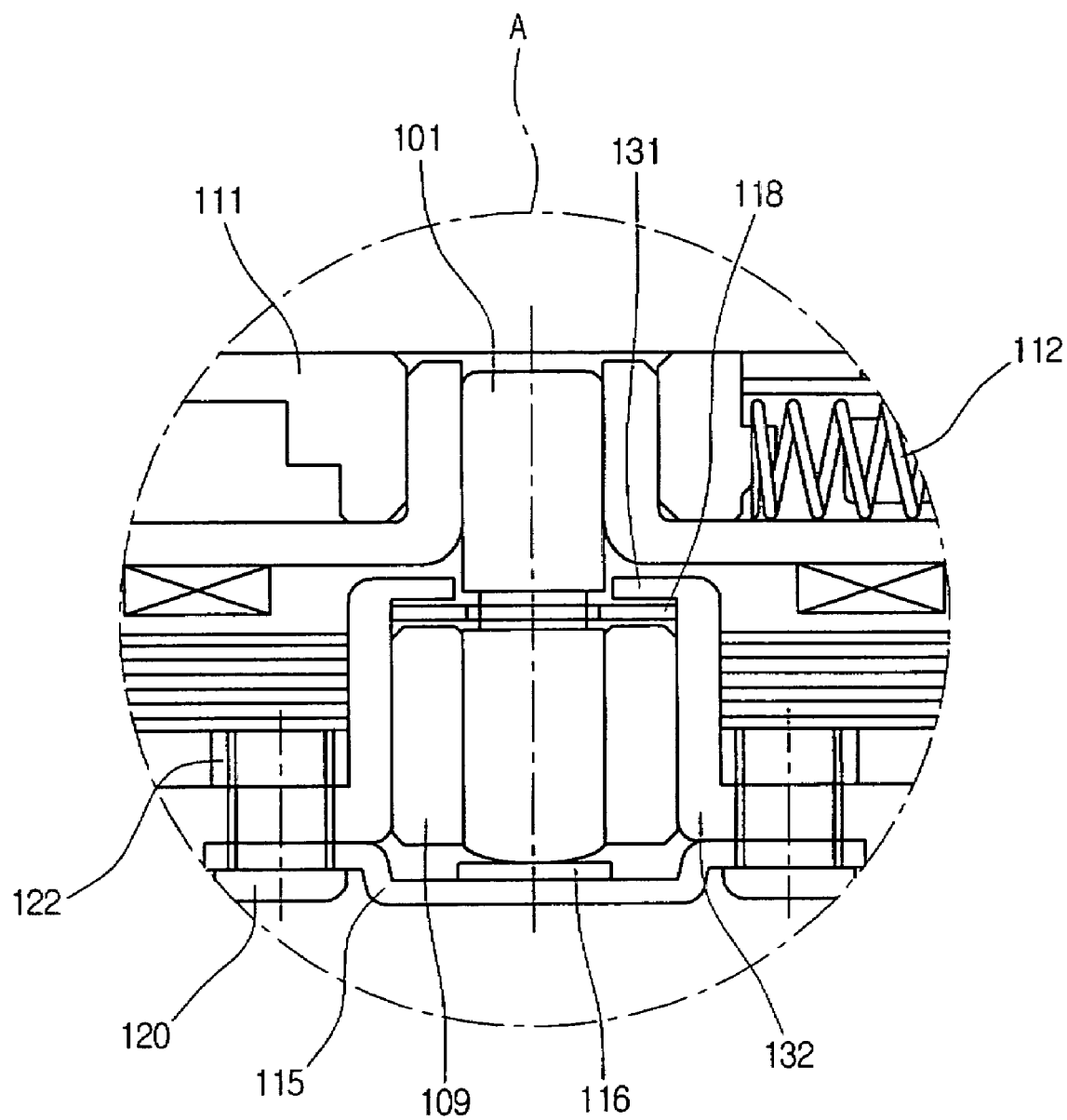
FIG. 2 is an enlarged sectional view of portion A in FIG. 1.

FIG. 1 is a sectional view showing a structure of a spindle motor which constitutes the first embodiment of the present invention, FIG. 2 is an enlarged sectional view of portion A in FIG. 1.

Referring to FIGS. 1 and 2, a spindle motor 100 according to the present invention includes a rotating rotor and a fixed stator, and a base to support the former two components.

The rotor includes a rotor yoke 103, a magnet 104, a rotating shaft 101, and a clamp case 111 with a built-in clamp 112. When the spindle motor 100 operates, the rotor rotates at high speed.

The stator corresponding to the rotor has coils 107 and a core 108, and the base includes a base plate 105 integrally formed with a housing 132. A thrust stopper 115 is mounted to the bottom surface of the base plate 105. A bearing 109 for allowing a smooth rotation of the rotating shaft 101 is disposed within the housing 132 of the base plate 105.

A circuit board 106 for receiving a control signal and operating the spindle motor 100 is disposed above the base plate 105.

Here, the thrust stopper 115 is fastened to the base plate 105 with screws 120, a supporting mold 122 is disposed around the housing 132 for supporting a core 108 around which coils 107 is wound.

The thrust plate is depicted in the FIGS. 1 and 2 by the reference number 116.

To prevent the rotating shaft 101 from rising, the ledge 131 is formed at the upper portion of the housing 132 of the base plate 105.

The rotating shaft 101 and the bearing 109 are inserted within the housing 132 of the base plate 105, and a washer 118 for preventing rise of the rotating shaft 101 is inserted between the upper end of the bearing 109 and the ledge of the housing.

A fixing recess is formed at the vicinity of middle of the rotating shaft 101 below the ledge 131 of the housing 132, and the washer 118 is fixed at the fixing recess, so that when the rotating shaft 101 rotates, the rotating shaft 101 is prevented from rising.

In the above-structured spindle motor 100, when the rotating shaft 101 rotates, the ledge 131 prevents oil from leaking from the housing 132 and fixes the washer 118 provided to prevent the rotating shaft 101 from rising.

That is, the washer 118 for preventing rise of the rotating shaft 101 is coupled to the fixing recess formed in the vicinity of middle of the rotating shaft 101, so that the rotating shaft does not rise when the rotor yoke 103 rotates at high speed.

Because the housing 132 supporting the bearing 109 and the base plate 105 are integrally formed in the present invention, assembly is made easier.

Figure 3:
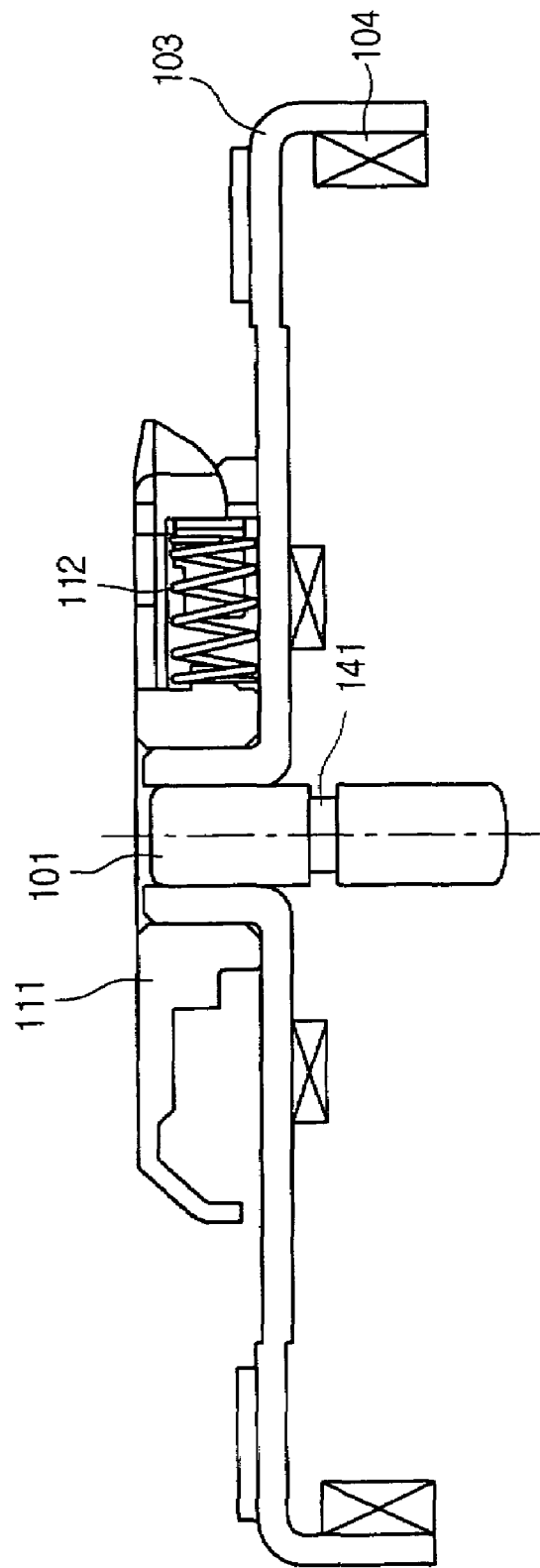
FIG. 3 is a sectional view showing a rotor which may be used for the spindle motor of the invention.

FIG. 3 is a sectional view showing a rotor which may be used for the spindle motor of the invention.

Referring to FIG. 3, the rotor of the spindle motor according to the present invention includes a cylindrical rotor yoke 103 and a magnet fixed inside the rotor yoke 103.

The rotating shaft 101 is fixed within the central region of the rotor yoke 103, and the fixing recess 141 is formed in the vicinity of middle of the rotating shaft 101 to prevent rise thereof.

The washer 118 is coupled in the fixing recess 141 to prevent the rotating shaft 101 from rising when it rotates. In this respect, the fixing recess 141 and the washer 118 may be categorized as rise preventing means for the rotating shaft 101.

A clamp case 111 for fixing an optical disc is fixed at the top of the rotating shaft 101, and a clamp 112 with an elastic member is assembled to the clamp case 111.

The rotor yoke 103 is integrally formed with the turntable, and a felt is mounted on the top of the rotor yoke 103 to place an optical disc thereon.

Thus, an optical disc with music, images, etc. recorded thereon may be placed on top of the rotor yoke 103 and fixed by the clamp 112 assembled on the clamp case 111.

Figure 4:
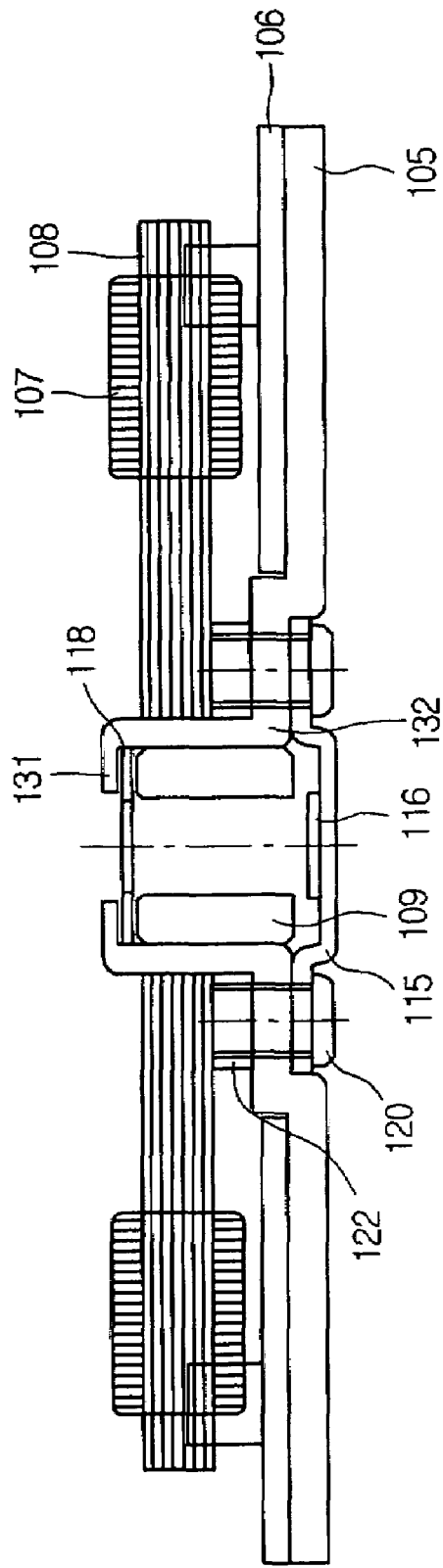
FIG. 4 is a sectional view showing a stator which may be used for the spindle motor of the invention.

FIG. 4 is a sectional view showing a stator which may be used for the spindle motor of the invention.

Referring to FIG. 4, the stator of the spindle motor according to the present invention has a base plate 105 formed integrally with the housing 132.

A circuit board 106, for applying a control signal, is mounted on top of the base plate 105.

Also, a bearing 109 is press-fitted into the housing 132 formed at the central portion of the base plate 105, and the ledge 131 is formed at the upper portion of the housing 132.

The ledge 131 prevents oil from leaking out from the housing 132 when the rotating shaft 101 rotates.

To prevent rise of the rotating shaft, a washer 118 is inserted between the bearing 109 within the housing 132 and the ledge 131. The washer 118 is connected to a fixing recess formed in the rotating shaft 101 to prevent rise of the rotating shaft 101 and the rotor yoke 103.

To seal the bearing 109 and the rotating shaft, the thrust stopper 115 is mounted to the bottom surface of the base plate 105.

The thrust stopper 115 is fixed to the base plate 105 by means of screws.

The supporting mold 122 is disposed between the base plate 105 and the core 108 to support the core 108 and adjust the height at which the core 108 is assembled.

The supporting mold 122 is fixed between the core 108 and the base plate 105 at the same time that the thrust stopper 115 is fixed to the base plate 105 with screws.

In the spindle motor according to the present invention, the housing fixing the bearing is integrally formed with the base plate, to simplify the assembly of the motor, thereby reducing motor manufacturing cost and time.

Also, the spindle motor according to the present invention has the housing with an upper portion that is bent inward towards the rotating shaft, forming the ledge to prevent oil leaking outside of the motor.

Furthermore, the spindle motor according to the present invention provides the washer between the ledge and the bearing and forms a recess on the rotating shaft for the washer to catch on, in order to prevent the rotating shaft and the rotor yoke from rising.

It will be apparent to those skilled in the art that various modifications and variations can be made in the present invention. Thus, it is intended that the present invention covers the modifications and variations of this invention provided they come within the scope of the appended claims and their equivalents.

What is claimed is:
1. A spindle motor comprising:
a rotor including a rotor yoke, a magnet, and a rotating shaft;
a stator corresponding to the rotor and including a core and coils;
a housing, the core being disposed at an exterior of the housing, the housing including a ledge, the ledge being an upper portion of the housing extending inwardly toward the rotating shaft;

a base including a base plate for supporting the stator, wherein the base plate is integrally formed with the housing;

a bearing provided in the housing for rotatably supporting the rotating shaft, and a thrust stopper for sealing the housing and being fixed to a bottom of the housing; and a washer located between the ledge and the bearing, the washer being stoppable by the ledge to restrain the rotating shaft from rising, wherein the rotating shaft has a fixing recess located around a circumference of the rotating shaft, and the washer surrounds the fixing recess, and wherein the bearing, the washer and the ledge are located on a same vertical plane parallel to the rotating shaft.

2. The spindle motor according to claim 1, further comprising a thrust plate provided between a lower end of the rotating shaft and the upper surface of the thrust stopper.

3. The spindle motor according to claim 1, further comprising a supporting mold located between the core and the base plate, the supporting mold being in contact with the core of the stator to support the core of the stator.

4. The spindle motor according to claim 3, wherein the thrust stopper, the base plate, and the supporting mold are fastened using screws.

5. The spindle motor according to claim 1, comprising a supporting mold to adjust the height of the core, at which the core is assembled, the supporting mold being in contact with the core.

6. The spindle motor according to claim 5, wherein the base plate, the thrust stopper and the supporting mold are fastened using screws.

7. A spindle motor comprising:

a rotor including a rotor yoke, a magnet, and a rotating shaft;

a stator corresponding to the rotor and including a core and coils;

a housing, the core being disposed at an exterior of the housing, the housing including a ledge, the ledge being an upper portion of the housing extending inwardly toward the rotating shaft;

a base including a base plate for supporting the stator, wherein the base plate is integrally formed with the housing;

a bearing provided in the housing for rotatably supporting the rotating shaft;

a thrust stopper for sealing the housing and being fixed to a bottom of the housing; and a washer located between the ledge and the bearing, the washer being stoppable by the ledge to restrain the rotating shaft from rising and the bearing, wherein the base plate includes a first lower surface and a second lower surface being protruded from the first lower surface in upper direction and the thrust stopper includes a first lower surface and a second lower surface being protruded from the first lower surface in upper direction.

8. The spindle motor according to claim 7, wherein the second lower surface of the base plate and the second lower surface of the thrust stopper are fastened using screws.

9. The spindle motor according to claim 7, comprising a supporting mold to adjust the height of the core, at which the core is assembled, the supporting mold being in contact with the core.

10. The spindle motor according to claim 9, wherein the second lower surface of the base plate, the second lower surface of the thrust stopper and the supporting mold are fastened using screws.

* * * * *